United States Patent [19]

Dobler et al.

[11] Patent Number: 5,107,212

[45] Date of Patent: Apr. 21, 1992

[54] MEASURING ARRANGEMENT HAVING AXIALLY AND RADIALLY OFFSET SENSOR COILS FOR CONTACTLESS DETERMINATION OF ROTATION ANGLE

[75] Inventors: Klaus Dobler, Gerlingen; Hansjoerg Hachtel, Weissach, both of Fed. Rep. of Germany

[73] Assignee: Robert Bosch GmbH, Stuttgart, Fed. Rep. of Germany

[21] Appl. No.: 625,218

[22] Filed: Dec. 10, 1990

[30] Foreign Application Priority Data

Jan. 20, 1989 [DE] Fed. Rep. of Germany ....... 4001544

[51] Int. Cl.$^5$ ................................................ G01B 7/30
[52] U.S. Cl. ........................... 324/207.16; 324/207.19; 324/207.22; 324/207.25
[58] Field of Search ............... 324/163, 164, 173, 174, 324/207.15, 207.16, 207.17, 207.18, 207.19, 207.25; 310/168; 340/870.31

[56] References Cited

U.S. PATENT DOCUMENTS

| 4,013,911 | 3/1977 | Fujiwara et al. ......... 324/207.17 X |
| 4,764,767 | 8/1988 | Ichikawa et al. ............... 324/174 X |
| 4,777,436 | 10/1988 | Fiori, Jr. ...................... 324/207.17 |
| 4,841,245 | 6/1989 | Fiori, Jr. ...................... 324/207.17 |

FOREIGN PATENT DOCUMENTS

| 1014226 | 7/1977 | Canada ................... 324/220 |
| 0186964 | 7/1986 | European Pat. Off. ........... 324/220 |
| 0922495 | 4/1982 | U.S.S.R. ................... 324/207.19 |

*Primary Examiner*—Gerard R. Strecker
*Attorney, Agent, or Firm*—Michael J. Striker

[57] ABSTRACT

A measuring arrangement for contactless determination of rotation angle has two bodies arranged movably relative to one another, sensor coils with inductive and alternating current resistance values variable by a relative change of size of portions of the bodies associated with the coils. The bodies include a first body divided into a plurality of regions corresponding to the coils and disassociated with a respective one of the coils. The regions are offset relative to one another in an axial direction and also offset in a radial direction in correspondence with the number of the regions by a certain angle. The coils are formed as wire coils.

11 Claims, 4 Drawing Sheets

FIG. 6
FIG. 7
FIG. 7a
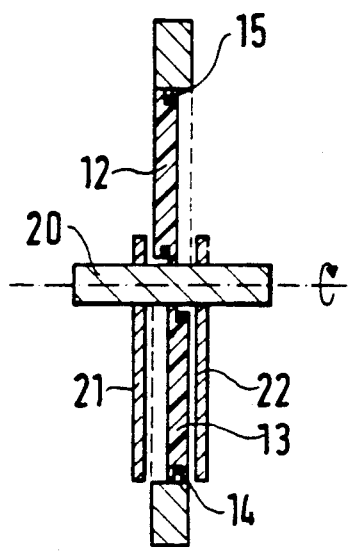
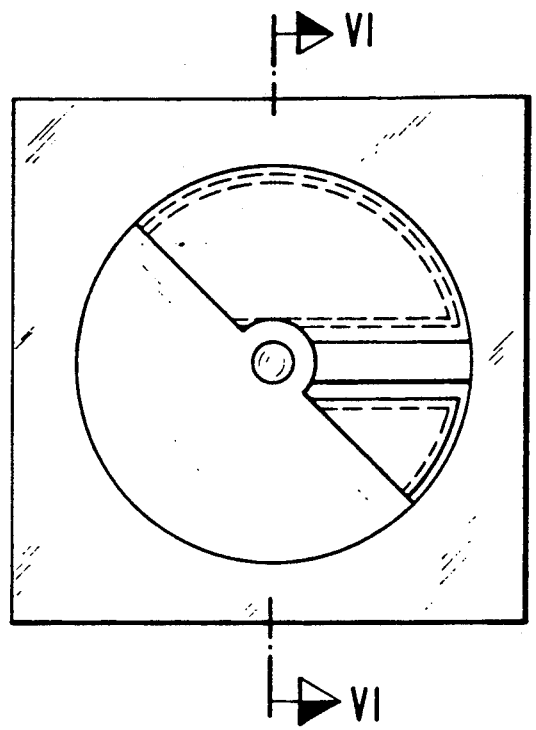
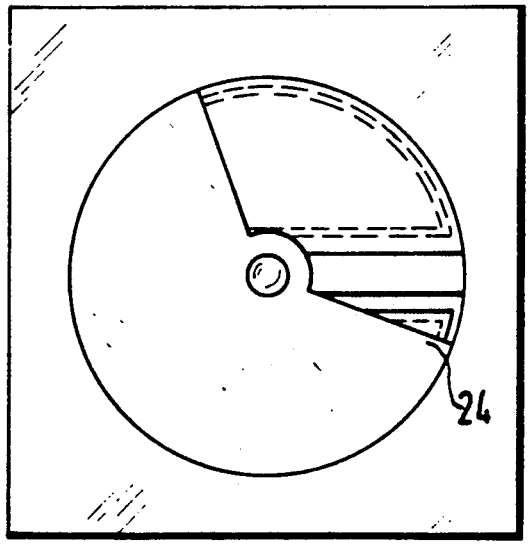

MEASURING ARRANGEMENT HAVING AXIALLY AND RADIALLY OFFSET SENSOR COILS FOR CONTACTLESS DETERMINATION OF ROTATION ANGLE

BACKGROUND OF THE INVENTION

The present invention relates to a measuring arrangement for determination of a rotation angle.

Arrangements of the above mentioned type are known in the art. One of such arrangements is disclosed for example in German document DE-OS 3,824,535.2. In this arrangement a central longitudinal groove is formed in a cylindrical coil body from its one end side. As a result two semi-circular cores are produced and the coil is wound on them. A measuring part which serves for damping is composed of electrically conductive and/or ferromagnetic material. It surrounds the outwardly located coil region at least partially in an axial length. An alternating current flows through the coils. Due to the relative rotation of the measuring part the overlapping ratio between the measuring part and the coil changes in an opposite direction and thereby the alternating current resistance of the coils is correspondingly varied. This measuring arrangement has the disadvantage that with the stationary coil cores the coils can be wound by a winding machine only one after the other. The winding technique and therefore the manufacture of the measuring device is therefore expensive.

A further measuring arrangement for contactless measurement of a displacement and/or angle change is disclosed in the German document DE-OS 3,824,534.5. In this document, two coils are applied by etching technique on a disc-shaped body. The etched coils can be used however only within a limited frequency region of the alternating current which flows through the coils.

SUMMARY OF THE INVENTION

Accordingly, it is an object of the present invention to provide a measuring arrangement of the above mentioned general type, which avoids the disadvantages of the prior art.

In keeping with these objects and with others which will become apparent hereinafter, one feature of the present invention resides, briefly stated, in a measuring arrangement in which a first body is subdivided into a plurality of regions corresponding to respective coils and at least one coil is arranged on the respective region, the regions are offset relative to one another in axial direction of the measuring arrangement, and also offset relative to one another in a radial direction in correspondence with the number of the regions by an angle, and finally the coils are formed as wire coils.

The measuring arrangement designed in accordance with the present invention, eliminates the disadvantages of the prior art.

The coils can be produced by simple manufacturing technique. Due to the axial offset of both coil bodies, both windings can be performed simultaneously by means of a single winding machine. The wire-wound coils, in contrast to the edge coils, can operate in a simple manner in a broad frequency region, for example between 5 kHz and 5 MHz. By changing the diameter of the coil wire and the windings number, the coil, despite the small size of the coil body, can correspond to the coil of the desired frequency. Especially when the wire coils have a high winding number, their manufacture is simpler than multi-layer etched or printed coils. The construction is simplified and thereby the manufacture of the measuring arrangement is simplified as well.

Furthermore, both coils can be covered at both end sides and/or the peripheral side with measuring parts of different materials. Therefore, for measuring signal generation the opposite action of the so-called magnetic effect and the eddy current effect can be used. The measuring errors due to the construction are therefore relatively low.

According to another feature of the present invention, a second body which is arranged in the peripheral direction around the first body has at least one region which has at least a partial length of the length of the coil corresponding to the first body and a separating part.

Still another feature of the present invention is that the second body is arranged on a rotatable structural part by means of a bar-shaped support. The support is located in the region of a coil which is spaced by a greater distance from it.

Second bodies can be located at both end sides of the first body, and the second bodies can be formed identically and located opposite to one another. The second body can have a region composed of ferromagnetic and electrically conductive or a ferromagnetic material, and a region composed of non-ferromagnetic but electrically conductive material.

The regions composed of the same material can be located opposite to one another. Discs can have an angular region which are equal or greater than that of the one coil.

The second bodies arranged at both sides of the first body can be connected by a connecting part in the peripheral direction of the first body.

Finally, the first body can have a D-shaped cross-section.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
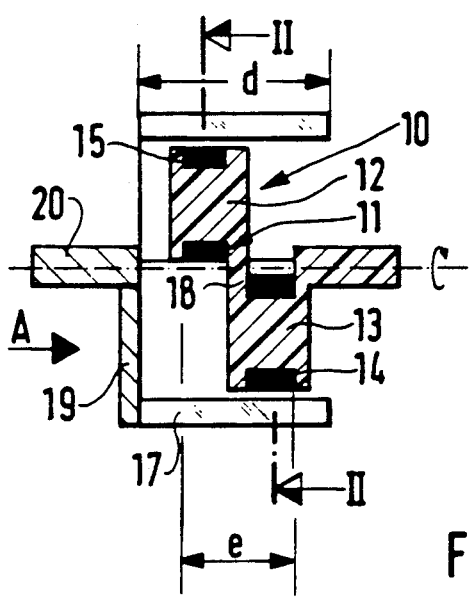
FIG. 1 is a view showing a longitudinal section of the measuring arrangement of the present invention.
Figure 3:
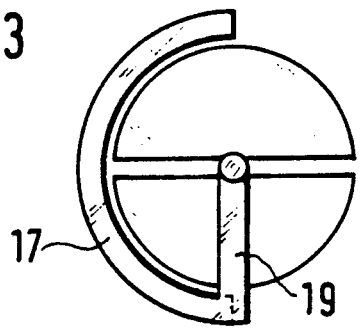
FIG. 3 is a plan view of the measuring arrangement in direction A of FIG. 1.

A sensor is identified as a whole with reference numeral 10 in FIG. 1. It has a coil body 11 which is preferably composed of an electrically non-conductive material. The coil body 11 has two cores which are offset relative to one another in an axial direction to have a cross-section of an approximately semi-circular shape or D-shape. Also, other core shapes are possible. The cores 12 and 13 are also offset relative to one another in a radial direction by 180° and therefore with the D- shaped construction of the cores 12 and 13 the plain surfaces are oriented toward the axis of the coil body 11. Wire coils 14 and 15 are wound on the cores 12, 13 in a peripheral direction of the coil body 11. Due to the axial offset of the cores 12 and 13, it is possible to wind both coils in many simple manufacturing processes with one coil machine without significant additional conversion. In particular, both coils 14 and 15 can be wound simultaneously, so that only one working step is required. A measuring part 17 is arranged around the coil body 11 at a small distance from the coil body. It is composed of an electrically conductive (ferromagnetic and/or not ferromagnetic) material or of ferromagnetic material. The measuring part 17 is formed as a sleeve segment and overlaps approximately the half periphery of the coil body as considered in a peripheral direction. The axial length d of the measuring parts 17 must have preferably at least the width e of the coils 14 and 15 and the region 18 of the coil body 11 located between the coils. When the length d is greater than the length e then no or only small axial adjusting errors of the measuring part 17 can occur. The measuring part 17 is connected with a shaft 20 by a disc-shaped or as shown in FIG. 3 a rod-shaped carrier 19. Rotary movement of the shaft 20 is to be determined. The shaft 20 can be however connected also with a not shown structural element, so that the rotary movement of the structural element is determined.

Rotary movements can be detected by means of the sensor 10. It is especially advantageous when, as shown in FIG. 1, the carrier 19 is moved during the measurements from the coil core 13 with a greater axial distance relative to the carrier. This has the advantage, as can be seen from the explanation of the operation hereinbelow, that by axial movements of the carrier 19 the measuring signal is not or not substantially influenced. It will be further emphasized that the carrier 19 has a relatively small width.

In the initial position the measuring part 17 is oriented so that it overlaps both coils 14 and 15 over equal peripheral surfaces as shown in FIG. 3. The sensor 10 can operate in accordance with the inductive and/or eddy current principle, and in both cases an alternating current flows through the coils 14 and 15. For measurements, the measuring part 17 is rotated around the coil body 11 or in another words moved by a desired angular region. The eddy current measuring principle will be explained hereinbelow. A magnetic alternating field is produced in the coils 14 and 15 and activates eddy current on the metallic surface of the measuring part 17. The greater is the surface of the measuring part 17 through which the magnetic field passes, the higher eddy currents are produced. Furthermore, the value of the produced eddy currents is dependent on the used material of the measuring part 17, as well as the distance of the coil 15 or 16 to the outer surface of the measuring part 17. Due to the eddy currents produced on the measuring part 17, the coil alternating current resistance is changed, and it is used for generation of the measuring signal. Since the coil inductivity also reduces, this inductivity change can also be used for generation of the measuring signal (coil inductivity/evaluating process). During the rotary movement of the measuring part 17 the surface of the measuring part 17 associated with the respective coil 14 or 15 changes in the opposite direction. Thereby the surface of the measuring part 17 facing toward the coil 14 for example is increased by the same amount by which the surface of the other coil 15 is reduced. Both coils 14 and 15 are connected with one another in a Wheatstone semi-bridge circuit. Therefore the measuring errors which simultaneously occur and have the same direction in the coils 14 and 15 are compensated.

When the width e is greater or also smaller than the width d of the measuring part 17, the axial play caused by the construction practically does not act or act only insignificantly as an error in the measurement signal. The insignificant error is actuated first of all by the changed distance of the carrier 19 relative to the coil 14. When the coils 14 and 15 are wound of wire, the coils 14 and 15 can operate in a broader frequency region of the alternating current. This region for example can be within approximately 5 kHz to 5 MHz. It suffices to change the diameter of the coils or the winding number of the windings of the coils 14 and 15 (for example by varying the number of the coil layers).

Figure 2:
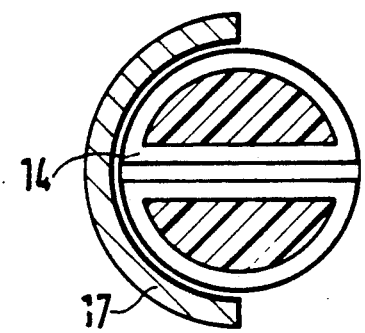
FIG. 2 is a view showing a section taken in direction II—II in FIG. 1.
Figure 4:
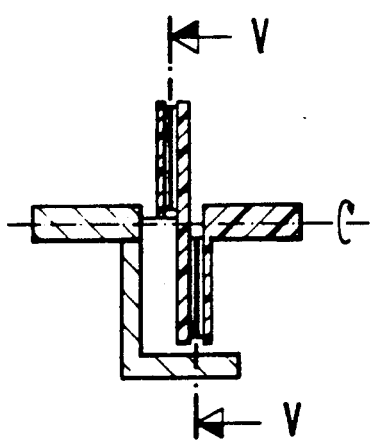
FIGS. 4, 5; 6, 7; 7a; 8, 9; 10, 11; 12, 13 are views showing further modifications of the measuring arrangement in accordance with the present invention.
Figure 5:
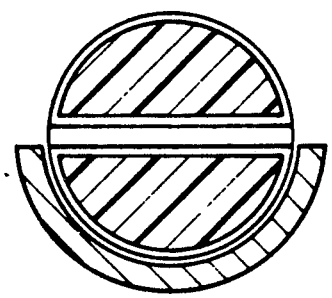

FIG. 1 shows the embodiment of the sensor 10 for a low carrier frequency. For this purpose relatively small radial dimensions of the cores 12 and 13, the coils are wound over a relatively great width, or in other words in the axial direction for example 4 mm per individual coil, and also have a high winding number. In contrast, in the embodiment of FIGS. 4 and 5, the sensor 10 is designed for a high carrier frequency. Here with the same radial dimension as in the embodiment of FIGS. 1–3, the coils are wound over a very short width and with a low winding number for example 1 mm per individual coil. Therefore, a sensor for high and for low frequencies can be produced with small changes in the mounting process. It is necessary for this purpose to change only the actual length of the core. By changing the number of the coil length the same effect can be obtained.

When the coils 14 and 15 are supplied with a high carrier frequency $f_T$ (frequency of the eddy current which flows through the coil) for example MHz, the propagation of the eddy current is strongly determined by the skin effect. That means that the produced electromagnetic alternating field of the coils 14 and 15 forms eddy current only in the outer layer of the surface of the measuring part 17 which faces toward the coils. When the coils 14 and 15 are supplied with an alternating current of very low carrier frequency $f_T$ for example more than 5 kHz, then the magnetic alternating field produced by the coils penetrates relative deeply into the surface of the measuring part 17 which faces the coils. The value of the penetration depth of the eddy current depends on the material of the measuring part 17. Due to the different carrier frequency, the wall thickness of the measuring part 17 can be varied. For example when due to the above described conditions a very small structural size of the sensor 10 is required, it operates with a relatively high carrier frequency, while to the contrary with sufficiently high structural conditions it can operate with lower frequencies.

Instead of the above described eddy current principle, also the inductive measuring process can be utilized. For this purpose the measuring part 17 on its surface which faces toward the coils must be composed of a ferromagnetic material. The masuring part 17 can be composed of a ferromagnetic material or provided with a ferromagnetic layer. In constrast to the eddy current principle the penetration depth of the electromagnetic alternating field of the coils 14 and 15 is smaller. While in the eddy current principle the coil inductivity is reduced, it can increase in the inductive process depending on the ferromagnetic and electrically conducting properties of the material (ferro-magnetic effect).

With respective determination of the most important parameters such as the value of the carrier frequency, material of t he measuring part 17, the operation can be performed so that during the inductive process the alternating current resistance increases, while during the eddy current process it reduces.

In the embodiment of FIGS. 6 and 7, the coil body 11 of the sensor is formed in correspondence with both previous embodiments. In contrast, no sleeve-shaped measuring part 17 which peripherally engages the coil body is used here. The measuring part on which the eddy current can be built is composed in this example of two discs 21 and 22. Discs are arranged at both end sides of the coil body 11 and have a semi-circuclar shape. Depending on whether the eddy current principle or the inductive measuring principle is used, the materials mentioned in the previous examples can be utilized for the discs 21 and 22. While in the previous embodiments the measuring signal is detected on the periphery of the coils, in the embodiment of FIGS. 6 and 7, the measuring signal generation is performed by discs 21 and 22 arranged on the end side. It should be noted that both discs 21 and 22 must be made as identical a possible, and arranged at both end sides in alignment opposite to one another.

Since the measuring signal is dependent on the distance of the discs to the coils, an approximately complete suppression of the measuring errors resulting from the axial offset of the measuring discs 21 and 22 can be obtained, since both measuring discs are fixedly connected with the shaft 20. Furthermore, it is possible, as shown in FIG. 7a, that the discs are formed as segments 24 with an angle greater than 180° or for example 200°. Thereby the approximately linear region of the calibration characteristic line can be extended.

Figure 8:
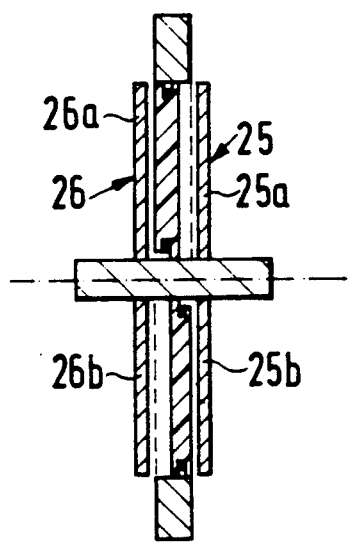
Figure 9:
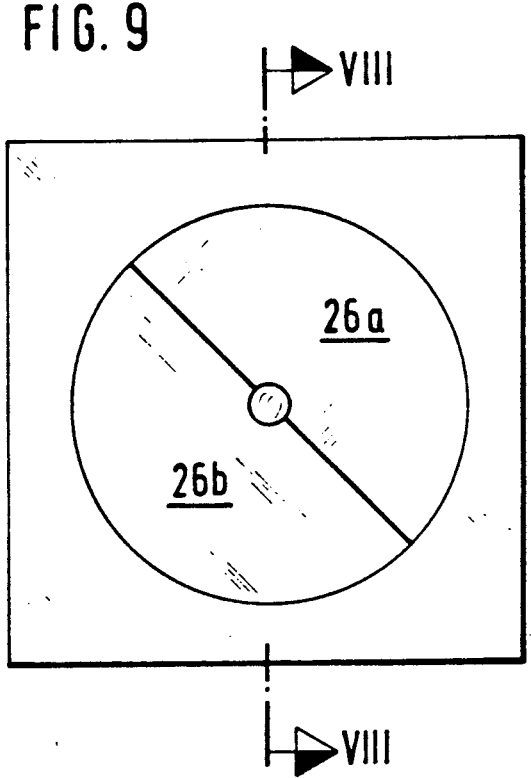

In the embodiment shown in FIGS. 8 and 9 both discs 21 and 22 are formed as circular disc 25 and 26. They are composed of two equal segments 25a, 25b or 26a, 26b. The segments 25a or 26a are composed of a material for operating in accordance with the eddy current principle, while the segments 25b and 26b are composed of a material for the inductive principle. The segments for one measuring principle are located at both end sides opposite to one another. Furthermore, the segments have respectively the same size. When for example the segments 25a, 26a are composed of ferro-magnetic material, for example automated steel, and the segments 25b, 26b are composed of non-ferromagnetic but electrically conductive materials, for example aluminum, then the opposite actions of the ferromagnetic effect activated by the segments 25b, 26b and the eddy current effect activated by the segments 25a, 26a can be utilized. As a result, in coil inductivity evaluation process, the measuring sensitivity of the sensor can be increased, while the ferro-magnetic effect causes the increase of inductivity of the respective coil and the eddy current effect causes a reduction of the inductivity of this coil. Both effects operate opposite to one another. The same is true for another evaluating process, for example evaluation of the coil alternating current resistance values. It is presumed that the parameters indicated above are determined so that the measuring signals of individual coils change oppositely.

Figure 10:
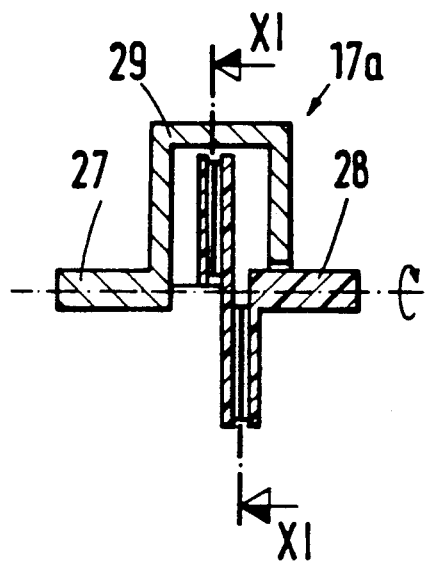
Figure 11:
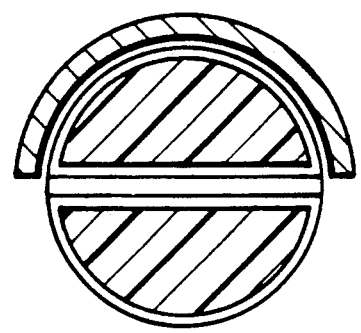

In the embodiment of FIGS. 10 and 11 the structural features of the embodiments of FIGS. 1 and 7 are combined. A measuring part 17a is composed of two semi-circular disc 27 and 28 arranged at both end sides and connected with one another by a sleeve-shaped part 29 in the peripheral direction of the coil body 11. It is therefore possible to use an eddy current design in three sides and therefore produce relatively high measuring signal.

Figure 12:
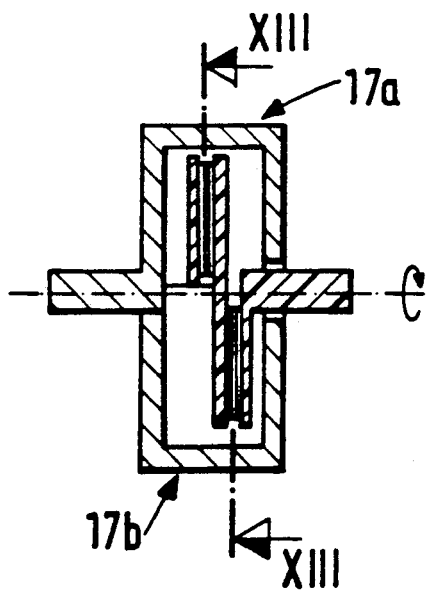
Figure 13:
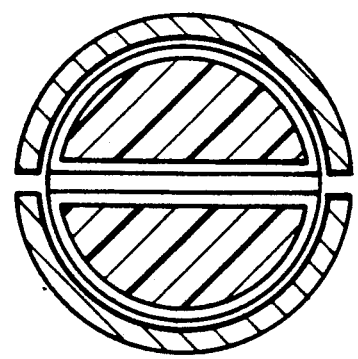

When analogously to the embodiment of FIGS. 8 and 9, both measuring effects are used, then as shown in FIGS. 12 and 13 an additional measuring part 17b is arranged. Then one measuring part 17a is composed of a material required for the eddy current process, and the other measuring part 17b is composed of a material required for the inductive process. The measuring effect corresponds to the effect described respect to the embodiment of FIGS. 8 and 9.

It is to be understood that it is also possible, instead of two coils to use four or greater number of coils. Thereby small measuring angles can be determined. For this purpose a corresponding number of cores which are offset in the axial direction can be utilized. In the event of four cores they are offset relative to one another by 90° in a radial direction. A coil is wound on each core, and they can be connected in a Wheatstone bridge circuit.

The measuring part 17 can perform a rotary movement over 360°. The specific measuring region is limited approximately to the tangential length of the coils and represents the shape of a delta voltage depending on the number of the coils (with four coils the maximum is approximately 90°).

It will be understood that each of the elements described above, or two or more together, may also find a useful application in other types of constructions differing from the types described above.

While the invention has been illustrated and described as embodied in a measuring arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A measuring arrangement for contactless determination of rotation angle, comprising two bodies arranged rotatably relative to one another about an axis of rotation so that a rotation angle between said two bodies is to be determined, said bodies including a first body having a plurality of regions which are composed of a nonconductive material and a second body which is composed of a material selected from the group consisting of an electrically conductive material and a ferromagnetic material, said regions of said first body being offset relative to one another in an axial direction by a certain distance and also in a radial direction by a certain angle, said second body being positioned adjacent the first body; a single sensor coil arranged on each of said regions of said first body, each of said sensor coils being provided as a wire coil and energized by an alternating current, said sensor coils having inductive and alternating current resistant values which are variable in response to a relative position of said regions of said first body relative to said second body and therefore in response to the proportion of overlapping of said coils and said second body during rotation of said bodies relative to one another so as to produce a measuring signal corresponding to the rotation angle between said two bodies.

2. A measuring arrangement for contactless determination of rotation angle, comprising two bodies arranged rotatably relative to one another about an axis of rotation so that a rotation angle between said two bodies is to be determined, said bodies including a first body having a plurality of regions which are composed of a non-conductive material and a second body which is composed of a material selected from the group consisting of an electrically conductive material and a ferromagnetic material, said regions of said first body being offset relative to one another in an axial direction by a certain distance and also in a radial direction by a certain angle, said second body being positioned adjacent the first body; a single sensor coil arranged on each of said regions of said first body, each of said sensor coils being provided as a wire coil and energized by an alternating current, said sensor coils having inductive and alternating current resistant values which are variable in response to a relative position of said regions of said first body relative to said second body and therefore in response to the proportion of overlapping of said coils and said second body during rotation of said bodies relative to one another so as to produce a measuring signal corresponding to the rotation angle between said two bodies, said body being arranged in a peripheral direction around said first body and with at least one region having an axial length corresponding to the length of said coils and the axial distance between said coils.

3. A measuring arrangement as defined in claim 2; and further comprising a rotatable structural element which rotates relative to said first body and a bar-shaped carrier, said second body being arranged on said rotatable structural element through said bar-shaped carrier.

4. A measuring arrangement as defined in claim 3, wherein said carrier is located near one of said coils which is located farthest from said carrier.

5. A measuring arrangement for contactless determination of rotation angle, comprising two bodies arranged rotatably relative to one another about an axis of rotation so that a rotation angle between said two bodies is to be determined, said bodies including a first body having a plurality of regions which are composed of a non-conductive material and a second body which is composed of a material selected from the group consisting of an electrically conductive material and a ferromagnetic material, said regions of said first body being offset relative to one another in an axial direction by a certain distance and also in a radial direction by a certain angle, said second body being positioned adjacent the first body; a single sensor coil arranged on each of said regions of said first body, each of said sensor coils being provided as a wire coil and energized by an alternating current, said sensor coils having inductive and alternating current resistant values which are variable in response to a relative position of said regions of said first body relative to said second body and therefore in response to the proportion of overlapping of said coils and said second body during rotation of said bodies relative to one another so as to produce a measuring signal corresponding to the rotation angle between said two bodies, said first body has two axial end sides, said second body having two second body parts located respectively at said end sides of said first body, said second body parts being approximately identical and located opposite to one another.

6. A measuring arrangement as defined in claim 5, wherein said second body parts have a region composed of a material selected from the group consisting of ferromagnetic and electrically conductive material and a ferromagnetic material, and another region composed of a not ferromagnetic but electrically conductive material.

7. A measuring arrangement as defined in claim 6, wherein said regions in said second body parts which have identical materials are located opposite to one another.

8. A measuring arrangement as defined in claim 5, wherein said second body parts are formed as discs which extend over an angular region equal to an angular region of said coils.

9. A measuring arrangement as defined in claim 5, wherein said second body parts are formed as discs which extend over an angular region greater than an angular region of said coils.

10. A measuring arrangement as defined in claim 5, and further comprising a connecting part which connects said second body parts with one another in a peripheral region of said first body.

11. A measuring arrangement for contactless determination of rotation angle, comprising two bodies arranged rotatably relative to one another about an axis of rotation so that a rotation angle between said two bodies is to be determined, said bodies including a first body having a plurality of regions which are composed of a non-conductive material and a second body which is composed of a material selected from the group consisting of an electrically conductive material and a ferromagnetic material, said regions of said first body being offset relative to one another in an axial direction by a certain distance and also in a radial direction by a certain angle, said second body being positioned adjacent the first body; a single sensor coil arranged on each of said regions of said first body, each of said sensor coils being provided as a wire coil and energized by an alternating current, said sensor coils having inductive and alternating current resistant values which are variable in response to a relative position of said regions of said first body relative to said second body and therefore in response to the proportion of overlapping of said coils and said second body during rotation of said bodies relative to one another so as to produce a measuring signal corresponding to the rotation angle between said two bodies, said regions of said first body each forming form a D-shaped cross-section.

* * * * *